(12) United States Patent
Choy et al.

(10) Patent No.: US 7,769,848 B2
(45) Date of Patent: Aug. 3, 2010

(54) METHOD AND SYSTEMS FOR COPYING DATA COMPONENTS BETWEEN NODES OF A WIRELESS SENSOR NETWORK

(75) Inventors: Eric Yee Teck Choy, Los Angeles, CA (US); Moon J. Kim, Wappingers Falls, NY (US); Jonghae Kim, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 1439 days.

(21) Appl. No.: 10/946,714

(22) Filed: Sep. 22, 2004

(65) Prior Publication Data

US 2006/0062154 A1    Mar. 23, 2006

(51) Int. Cl.
  *G06F 15/173* (2006.01)
  *H04L 12/26* (2006.01)
(52) U.S. Cl. .................. 709/224; 709/223; 370/242; 370/338; 340/539.22; 340/539.1; 340/298; 340/552; 342/463; 342/464
(58) Field of Classification Search .................. 709/200, 709/238, 223, 224
See application file for complete search history.

(56) References Cited

U.S. PATENT DOCUMENTS

| | | | |
|---|---|---|---|
| 3,828,306 A | 8/1974 | Angeloni | |
| 5,389,935 A | 2/1995 | Drouault et al. | |
| 5,504,717 A | 4/1996 | Sharkey et al. | |
| 5,565,858 A | 10/1996 | Guthrie | |
| 5,774,876 A | 6/1998 | Woolley et al. | |
| 5,804,810 A | 9/1998 | Woolley et al. | |
| 6,155,292 A | 12/2000 | Kurata | |
| 6,169,476 B1 | 1/2001 | Flanagan | |
| 6,293,861 B1 | 9/2001 | Berry | |

(Continued)

FOREIGN PATENT DOCUMENTS

CN    1486453    3/2004

(Continued)

OTHER PUBLICATIONS

Xuhui Hu et al, "Route Update and Repair in Wireless Sensor Networks", Consumer Communications and Networking Conference, 2004, CCNC 2004, First IEEE Las Vegas, NV, USA , Jan. 5-8 , 2004, Piscataway, NJ, USA, IEEE, Jan. 5, 2004, pp. 82-87.

(Continued)

*Primary Examiner*—Jude J Jean Gilles
(74) *Attorney, Agent, or Firm*—William Schiesser; Hoffman Warnick LLC

(57) ABSTRACT

Under the present invention, a wireless sensor network comprising a plurality of peer to peer nodes is provided. Each node in the network includes, among other things, a sensor for detecting environmental factors. When a potential failure is detected within a node, the node will query its neighboring nodes to determine whether they have the capability to store any data component(s) currently stored within the potentially failing node. Based on the querying, the data component(s) in the potentially failing node are copied to one or more of the neighboring nodes. Thereafter, details of the copying can be broadcast to other nodes in the network, and any routing tables that identify the locations of data components stored throughout the wireless sensor network can be updated.

33 Claims, 12 Drawing Sheets

U.S. PATENT DOCUMENTS

| | | | |
|---|---|---|---|
| 6,437,692 | B1 | 8/2002 | Petite et al. |
| 6,614,351 | B2 | 9/2003 | Mann et al. |
| 6,661,635 | B1 | 12/2003 | Meid |
| 6,684,137 | B2 | 1/2004 | Takagi et al. |
| 6,693,511 | B1 | 2/2004 | Seal |
| 6,795,786 | B2 | 9/2004 | LaMarca et al. |
| 6,820,210 | B1* | 11/2004 | Daruwalla et al. ............. 714/4 |
| 6,888,459 | B2 | 5/2005 | Stilp |
| 6,934,540 | B2 | 8/2005 | Twitchell, Jr. |
| 6,937,602 | B2 | 8/2005 | Whitehill et al. |
| 6,947,957 | B1* | 9/2005 | Lange ....................... 707/200 |
| 7,019,639 | B2 | 3/2006 | Stilp |
| 7,081,818 | B2 | 7/2006 | Eckstein et al. |
| 7,089,099 | B2 | 8/2006 | Shostak et al. |
| 7,096,125 | B2 | 8/2006 | Padmanabhan et al. |
| 7,212,121 | B2 | 5/2007 | Hashimoto et al. |
| 7,225,220 | B2 | 5/2007 | Gonzalez et al. |
| 7,277,950 | B1 | 10/2007 | Chapweske |
| 7,317,898 | B2 | 1/2008 | Tegreene |
| 7,460,549 | B1 | 12/2008 | Cardei et al. |
| 2002/0103907 | A1 | 8/2002 | Petersen |
| 2002/0116460 | A1 | 8/2002 | Treister et al. |
| 2002/0161821 | A1 | 10/2002 | Narayan et al. |
| 2003/0063585 | A1 | 4/2003 | Younis et al. |
| 2003/0137415 | A1 | 7/2003 | Thomson |
| 2003/0151513 | A1 | 8/2003 | Herrmann et al. |
| 2003/0222777 | A1 | 12/2003 | Sweatt |
| 2003/0234730 | A1 | 12/2003 | Arms et al. |
| 2004/0021582 | A1 | 2/2004 | Ohdachi et al. |
| 2004/0028023 | A1 | 2/2004 | Mandhyan et al. |
| 2004/0030507 | A1 | 2/2004 | Jung |
| 2004/0083278 | A1 | 4/2004 | Becherer |
| 2004/0153458 | A1 | 8/2004 | Noble et al. |
| 2005/0012613 | A1 | 1/2005 | Eckstein et al. |
| 2005/0060202 | A1 | 3/2005 | Taylor et al. |
| 2005/0087235 | A1 | 4/2005 | Skorpik et al. |
| 2005/0088299 | A1 | 4/2005 | Bandy et al. |
| 2005/0162270 | A1 | 7/2005 | Lambright et al. |
| 2005/0198228 | A1 | 9/2005 | Bajwa et al. |
| 2005/0212661 | A1 | 9/2005 | Friedrich |
| 2006/0025897 | A1 | 2/2006 | Shostak et al. |
| 2006/0062154 | A1 | 3/2006 | Choy et al. |
| 2006/0080819 | A1 | 4/2006 | McAllister |
| 2006/0126501 | A1* | 6/2006 | Ramaswamy ............... 370/221 |
| 2006/0181414 | A1 | 8/2006 | Bandy et al. |
| 2007/0020153 | A1 | 1/2007 | Hyacinthe |
| 2008/0034108 | A1 | 2/2008 | Chapweske |
| 2008/0132264 | A1* | 6/2008 | Krishnamurthy et al. .... 455/522 |
| 2008/0198753 | A1 | 8/2008 | Choudhury et al. |

FOREIGN PATENT DOCUMENTS

| | | | |
|---|---|---|---|
| EP | 0722141 | A2 | 7/1996 |
| EP | 0942274 | A2 | 9/1999 |
| EP | 1441320 | A1 | 7/2004 |
| FR | 2721129 | A1 | 12/1995 |
| WO | 2006045793 | A1 | 5/2006 |

OTHER PUBLICATIONS

IBM, END920040139CN1, Information Disclosure Statement Correspondence, Aug. 15, 2008.

Wise, "Integrated Microsystems: Merging MEMS, Micropower Electronics, an Wireless Communications", IEEE Xplore, 2 pages.

Wei, "Grid Gateway: Message-Passing Between Separated Cluster Interconnects", Institute of Computing Technology, Chinese Academy of Sciences, Beijing, 8 pages.

Boukerche et al., "Analysis of a Randomized Congestion Control Scheme with DSDV Routing in ad Hoc Wireless Networks", Journal of Parallel and Distributed Computing, pp. 967-995, Feb. 26, 2002.

Marsh, "Autonomic Wireless Sensor Networks", www.sciencedirect.com, Engineering Applications of Artificial Intelligence, 17, 2004, pp. 741-748.

Heo, "Information Materials for IDS", CHA IP Law, Sep. 3, 2009, 2 pages.

Truong, "Self-Managing Sensor-Based Middleware for Performance Monitoring and Data Integration in Grids", 19th IEEE international Parallel and Distributed Processing Symposium '05, 10 pages.

Hong, "Load Balanced, Energy-Aware Communications for MARS Sensor Networks", IEEE Xplore, Aerospace Conference Proceedings, 2002, 9 pages.

Choi et al, "The Mote Connectivity Protocol", 2003, pp. 533-538, IEEE, Authorized licensed use limited to: Korean Intellectual Property Office, downloaded on Aug. 25, 2009, IEEE Xplore.

Kim, U.S. Appl. No. 11/531,723, Office Action Communication, May 1, 2009, 8 pages.

Kim, U.S. Appl. No. 11/531,723, Notice of Allowance & Fees Due, Sep. 21, 2009, 8 pages.

Ferri, U.S. Appl. No. 10/856,684, Office Action Communication, Mar. 25, 2008, 14 pages.

Ferri, U.S. Appl. No. 10/856,684, Notice of Allowance and Fee(s) Due, Aug. 26, 2008, 9 pages.

Amanuddin, U.S. Appl. No. 11/220,961, Office Action Communication, Jan. 27, 2009, 20 pages.

Amanuddin, U.S. Appl. No. 11/220,961, Office Action Communication, Sep. 8, 2008, 32 pages.

Amanuddin, U.S. Appl. No. 11/220,961, Office Action Communication, May 11, 2009, 22 pages.

Childs, "Deployment of Grid Gateways Using Virtual Machines", Department of Computer Science, Trinity College, Dublin, Ireland, 10 pages.

IBM China Ltd., "IDS", Apr. 24, 2009, 2 pages.

Amanuddin, U.S. Appl. No. 10/972,610, Office Action Communication, Feb. 8, 2010, 21 pages.

Amanuddin, U.S. Appl. No. 11/220,961, Office Action Communication, Dec. 8, 2009, 42 pages.

Ferri, U.S. Appl. No. 12/204,981 Filed Sep. 5, 2008, Office Communication dated Feb. 19, 2010, 24 pages.

Amanuddin, U.S. Appl. No. 11/220,961, Office Action Communication, May 13, 2010, 28 pages.

* cited by examiner

METHOD AND SYSTEMS FOR COPYING DATA COMPONENTS BETWEEN NODES OF A WIRELESS SENSOR NETWORK

CROSS-REFERENCE TO RELATED APPLICATION

This application is related in some aspects to commonly assigned U.S. patent application Ser. No. 10/856,684, entitled "Wireless Sensor Network," filed May 28, 2004 and hereby incorporated by reference.

FIELD OF THE INVENTION

The present invention generally relates to a method and systems for copying data between nodes of a wireless sensor network. Specifically, the present invention, relates to the copying of data components between the nodes when a potential failure is detected.

BACKGROUND OF THE INVENTION

In traditional computer-based storage systems, data is typically stored in sophisticated systems with layers of protections, backups systems, and encryption algorithms. However, today, there exist numerous environmental-based public safety hazards, such as brush fires, bio-chemical accidents or attacks, etc. Obtaining real-time and accurate information about such a hazard can be critical to containing the hazard and minimizing damage. In existing storage systems, data can still be lost as a consequence of technical failures, viruses, or unpredictable disasters. A current focus is to build a static structure that contains the data and its backup. Unfortunately, this does not help in a globally distributed networked environment. Moreover, conventional disaster recovery systems fail to protect the data from outside attacks (e.g. hackers) and natural disasters.

The above-incorporated patent application takes a step towards avoiding data loss by providing a wireless sensor network in which a plurality of nodes/nodes are interconnected (e.g., on a peer to peer basis). To store a data set within the wireless sensor network, the data set is broken up into data components, which are then stored among the nodes of the network. Storage of the data components typically occurs by following a routing path through the network according to a routing table or the like. As the path is followed, the data components are stored among the nodes. Further, each node in the network is provided with a sensor for sensing environmental factors that could impact the capability of a node to transmit or store the data components. Other examples of sensor based detection systems are described in U.S. Pat. No. 6,169,476 B1, and U.S. Pat. No. 6,293,861 B1, both of which are incorporated by reference.

Unfortunately, no existing system provides a way to handle a potential failure of a node after a data component has been stored therein. Specifically, no existing system provides a way to replicate/copy a data component from a potentially failing node to another node in the network. In view of the foregoing, there exists a need for a method and systems for copying data components among nodes in a wireless sensor network. Specifically, a need exists for a system that can effectively copy a data component from a potentially failing node to a neighboring node that is capable of receiving the data component.

SUMMARY OF THE INVENTION

In general, the present invention provides a method and systems for copying data between nodes of a wireless sensor network. Specifically, under the present invention, a wireless sensor network comprising a plurality of peer to peer nodes is provided. Each node in the network includes, among other things, a sensor for detecting environmental factors. When a potential failure is detected within a node, the node will query its neighboring nodes to determine whether they have the capability to store any data component(s) currently stored within the potentially failing node. Based on the querying, the data component(s) in the potentially failing node are copied to one or more of the neighboring nodes. Thereafter, details of the copying can be broadcast to other nodes in the network, and any routing tables that identify the locations of data components stored throughout the wireless sensor network can be updated.

A first aspect of the present invention provides method for copying data components between nodes in a sensor network of peer to peer nodes, comprising: sensing a potential failure within one of the nodes; quering neighboring nodes of the one node to determine a capability of the neighboring nodes to store a data component currently stored within the one node; copying the data component to at least one of the neighboring nodes based on the querying; and broadcasting details of the copying from the at least one neighboring node to nodes that are adjacent to the at least one neighboring node.

A second aspect of the present invention provides a wireless sensor network, comprising: a plurality of nodes, each node including a sensor, query system for querying neighboring nodes, and a communication system for copying data components to the neighboring nodes based on the querying; a global routing table identifying locations of data components as stored among the nodes; and an update system for updating the global routing table when data components are copied to the neighboring nodes.

A third aspect of the present invention provides a node for use in a sensor network, comprising: a sensor for detecting a potential failure within the node; a query system for querying neighboring nodes when the sensor detects the potential failure; a communication system for copying a data component currently stored within the node to at least one of the neighboring nodes based on the querying; and an update system for updating a routing table when the data component is copied.

A fourth aspect of the present invention provides a program product stored on a recordable medium for copying data components between nodes in a sensor network of peer to peer nodes, comprising: program code for querying neighboring nodes when a sensor within a particular node detects a potential failure; program code for copying a data component currently stored within the particular node to at least one of the neighboring nodes based on the querying; and program code for updating a routing table when the data component is copied.

A fifth aspect of the present invention provides a system for deploying an application for copying data components between nodes in a wireless sensor network of peer to peer nodes, comprising: a computer infrastructure being operable to: query neighboring nodes when a sensor within a particular node detects a potential failure; copy a data component currently stored within the particular node to at least one of the neighboring nodes based on the querying; and update a routing table when the data component is copied.

A sixth aspect of the present invention provides computer software embodied in a propagated signal for copying data components between nodes in a wireless network of peer to peer nodes, the computer software comprising instructions to cause a computer system to perform the following functions: query neighboring nodes when a sensor within a particular node detects a potential failure; copy a data component currently stored within the particular node to at least one of the neighboring nodes based on the querying; and update a routing table when the data component is copied.

Therefore, the present invention provides a method and systems for copying data between nodes of a wireless sensor network.

BRIEF DESCRIPTION OF THE DRAWINGS

These and other features of this invention will be more readily understood from the following detailed description of the various aspects of the invention taken in conjunction with the accompanying drawings in which.

Figure 1:
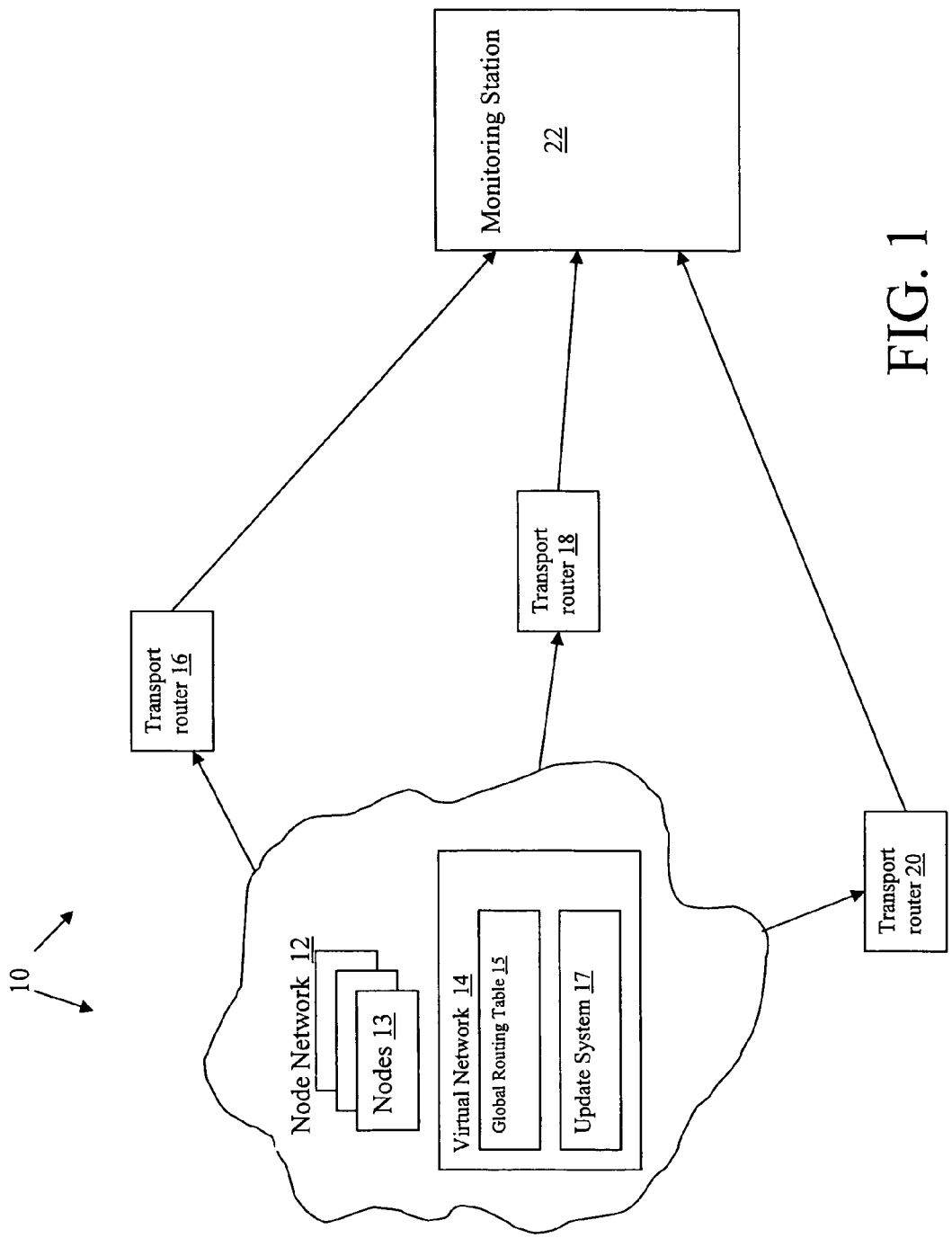
FIG. 1 depicts an illustrative wireless sensor network in accordance with the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a method and systems for copying data between nodes of a wireless sensor network. Specifically, under the present invention, a wireless sensor network comprising a plurality of peer to peer nodes is provided. Each node in the network includes, among other things, a sensor for detecting environmental factors. When a potential failure is detected within a node, the node will query its neighboring nodes to determine whether they have the capability to store any data component(s) currently stored within the potentially failing node. Based on the querying, the data component(s) in the potentially failing node are copied to one or more of the neighboring nodes. Thereafter, details of the copying can be broadcast to other nodes in the network, and any routing tables that identify the locations of data components stored throughout the wireless sensor network can be updated.

Referring now to the drawings, FIG. 1 depicts an illustrative wireless sensor network 10 according to the present invention that includes a node network 12, one or more transport routers 16, 18, 20, and one or more monitoring stations 22. Node network 12 comprises: (1) a plurality of nodes 13 for sensing environmental changes, and for communicating and storing data components, and (2) a virtual network 14 that provides a communication infrastructure for routing data amongst the plurality of nodes 13 through a mesh or ad hoc network. As described in further detail below, each node is a self-contained unit that is capable of communicating wirelessly to neighboring nodes. Moreover, virtual network 14 includes a global routing table 15 that can be periodically updated with update system 17, or by individual nodes 13 (as will be further described below).

Transport routers 16, 18, 20 may comprise any type of router capable of relaying data between node network 12 and monitoring station 22. Examples include high power cell towers, radio transmitters, microwave transmitters, etc. Monitoring station 22 may comprise any type of facility where sensed data from the node network 22 can be analyzed, stored, displayed, etc.

Node network 12 may be implemented in an ad hoc or mesh network that comprises either a full mesh or partial mesh topology. In a full mesh topology, each node is in communication with each other. In a partial mesh topology, each node is not necessarily in communication with the other nodes. While the invention is described as being implemented in a wireless environment, it is recognized that some or all of the communications could be implemented using a wired technology.

Figure 2:
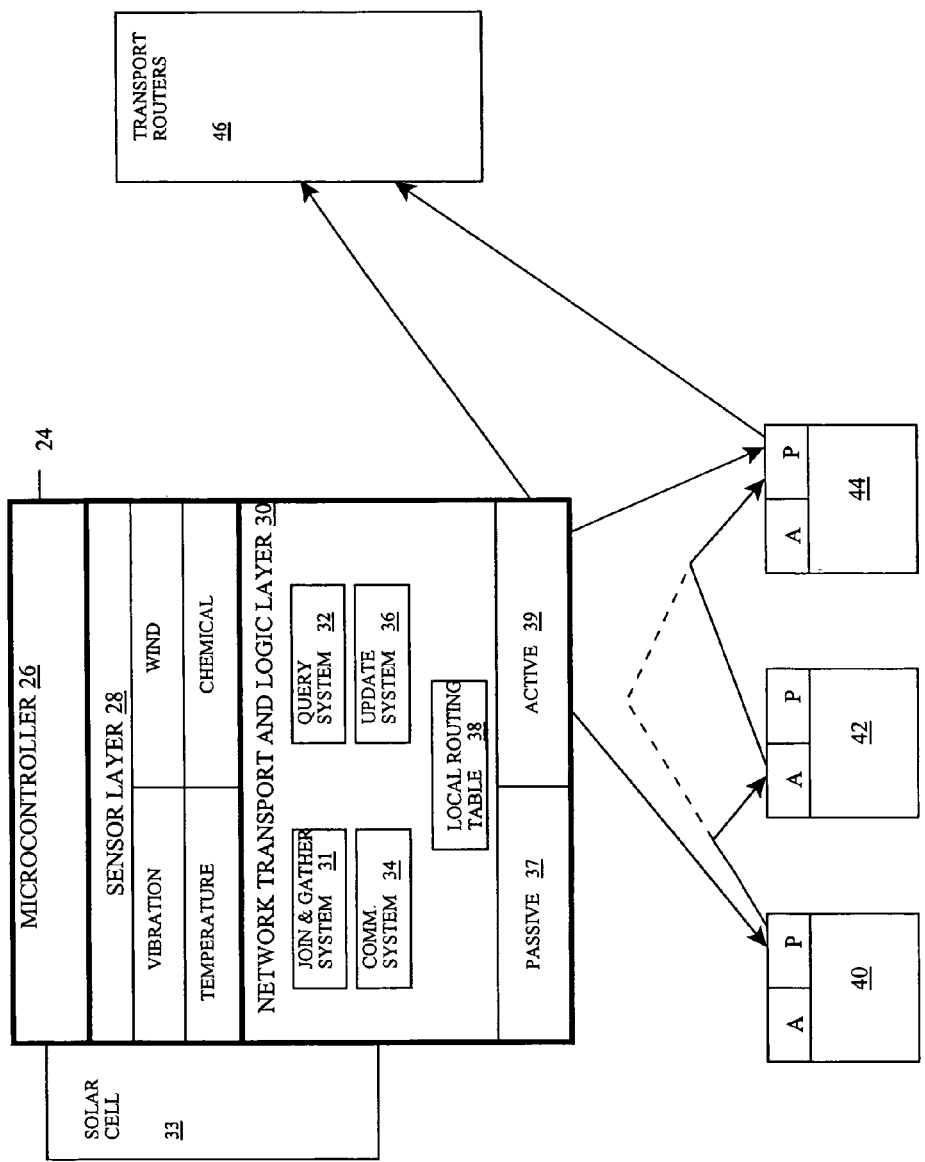
FIG. 2 depicts a plurality of nodes in accordance with the present invention.

Referring now to FIG. 2, a plurality of nodes 24, 40, 42, 44 are depicted, with node 24 being shown in detail. In this illustrative example, node 24 includes a microcontroller 26; a sensor layer 28 for sensing environmental changes in, e.g., vibration, wind, chemicals and temperature; a network transport and logic layer 30 having a passive layer 37 and an active layer 39; and a energy supply, in this case solar cell 33.

The functions of microcontroller 26 may include: controlling the overall tasks to be performed by node 24 (e.g., scheduling sensor readings and communications), controlling power to the various components, processing sensed data, determining the status of the node 24, maintaining and updating the global routing table 15 (FIG. 1), etc. Sensor layer 28 may comprise any type of sensor or sensors that measure some environmental stimuli, including physical, chemical, or biological changes. Sensor layer 28 may collect, process and store sensed data. Network transport layer 30 may comprise any type of wireless communication system that allows node 24 to communicate with neighboring nodes 40, 42, 44, and/or transport routers 46.

As noted, each node includes a passive layer 37 and an active layer 39. The passive layer 37 is used for passing or "hopping" data from one node to another. Active layer 39 is utilized for communicating data gathered or generated by the node itself. Thus, in this illustrative embodiment, data originating from node 24 could potentially be passed directly to a transport router 46, be hopped through node 44 to a transport router 46, or be hopped through nodes 40, 42 and 44, before being passed to a transport router 46. In the event that node 42 became unavailable, the data could for example be re-routed from node 40 to node 44 (via the dashed line).

As described in the above cross-referenced patent application, each node includes a join and gather system 31 for allowing the node to be "joined" into the network by a neighbor, and allowing the node to gather its neighbors into the network. Functional capabilities of the neighboring nodes, including communication routing information, as well as the data components that are stored in neighboring nodes are maintained in a local routing table 38. For example, local routing table 38 within node 24 could identify the data components that are stored within neighboring nodes 40, 42 and 44. As will be further described below, query system 32 allows a node 24 to query neighboring nodes 40, 42 and 44 when sensor layer 28 detects a potential failure within the node 24. Based on the querying, communication system 34 can then copy/replicate any data components stored within node 24 to one or more of the neighboring nodes 40, 42 and 44 (e.g., via passive layer 37 or active layer 39). Thereafter, the communication systems 34 within the node(s) 40, 42 and 44 receiving the data components will broadcast details of the copying to their neighboring nodes (not shown). Still yet, after the copying, the update system 36 within the pertinent nodes will update local routing tables 38 and global routing table 15 (FIG. 1) as necessary (e.g., to reflect the new location of the copied data components).

It should be understood that nodes under the present invention can include other computerized components not shown such as a processing unit, memory, a bus, input/output (I/O) interfaces, external devices/resources and a storage unit. The processing unit may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, similar to the processing unit, memory may reside at a single physical location, comprising one or more types of data storage, or be distributed across a plurality of physical systems in various forms.

The I/O interfaces may comprise any system for exchanging information to/from an external source. The external devices/resources may comprise any known type of external device, including speakers, a CRT, LED screen, hand-held device, keyboard, mouse, voice recognition system, speech output system, printer, monitor/display, facsimile, pager, etc. The bus would provide a communication link between each of the components in the nodes and likewise may comprise any known type of transmission link, including electrical, optical, wireless, etc.

If utilized, the storage unit can be any system (e.g., a database) capable of providing storage for data components. As such, the storage unit could include one or more storage devices, such as a magnetic disk drive or an optical disk drive. In another embodiment, the storage unit includes data distributed across, for example, a local area network (LAN), wide area network (WAN) or a storage area network (SAN) (not shown).

Referring again to FIG. 1, to ensure that nodes 13 within node network 12 are able to relay the information gathered from their various attached sensors, they must rely heavily on communication paths through neighboring nodes. These paths are determined based on global routing table 15 that is periodically updated by update system 17 (or by the update system 36 of individual nodes). In one embodiment, the global routing table 15 is embodied in the local routing tables 38 stored with each of the nodes 13. As described in detail in the above cross-referenced patent application, the local routing tables 38 can be created using a "pre-active heartbeat" algorithm that ranks possible routing paths for each node to relay data back to the main monitoring station.

As also noted, a "pre-active heartbeat" algorithm can be utilized to update the local routing table 38 for each node in the node network 12. To accomplish this, the algorithm causes nodes to gather their neighboring nodes into the network 12, then have the neighboring nodes gather their neighboring nodes, etc., until all the nodes have been gathered. The process begins at an Endpoint and expands outwardly across the node network 12. Later, when sensor data is collected from the nodes 13, the collected data is sent back to the Endpoints. An Endpoint may simply comprise a special type of node that is for example capable of communicating to a transport router. Each node is capable of communicating with one or more neighbors. It should be noted that while this process is described with reference to enabling a node network 12, the methodology could be applied to enabling any type of network utilizing any type of communication device, e.g., cell phones, wireless routers, PDA's, etc.

When a node is first powered up, its communication is limited to a JOIN broadcast message, which essentially says, "I'd like to join a network." Thus, when a node network is first turned on, each node can only broadcast a JOIN, and will not receive a response until an endpoint gets involved. Endpoints are initialized with the capability of responding to JOIN broadcasts. Namely, an Endpoint will answer all JOIN broadcasts that it can detect with a GATHER response. Thus, an Endpoint recognizes JOIN broadcasts from neighboring nodes, and responds with a GATHER. As soon as a node recognizes a GATHER, the node becomes a member of the network and stops broadcasting the JOIN. Thus, initially, the node network is comprised of the Endpoint and the Endpoint's neighboring nodes. Neighboring nodes may for example be defined as a set of nodes that can communicate with each other.

As soon as a node establishes itself in a network, the node switches to a GATHER broadcast to gather its own neighbors. Thus, the cycle repeats itself, with each node broadcasting a JOIN getting picked up as a neighbor of another nearby gathering node (or endpoint). Again, whenever a node becomes a neighbor within the network, it switches from JOIN to GATHER. Very quickly, all nodes will become another node's neighbor. As soon as a node becomes a neighbor, it can collect data and send it to a neighbor. The neighbor will pass the data to its neighbor, etc., until the data makes its way back to the Endpoint. Network redundancy is established by allowing each node to have many neighbors within the network in a manner described below.

After a short period, the entire mesh network is established. At some point, when a node is no longer receiving JOIN requests, a node can determine that the network is formed. Each node will still send out GATHERs, but at a much lower frequency, since the only new nodes that would join are nodes that for example replace broken nodes.

Figure 3:
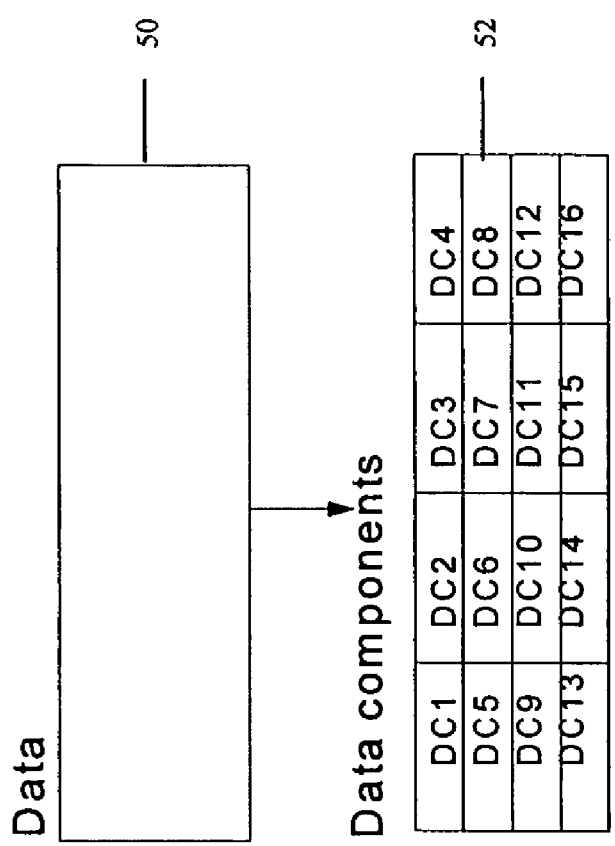
FIG. 3 depicts a data set being broken up into data components.
Figure 4:
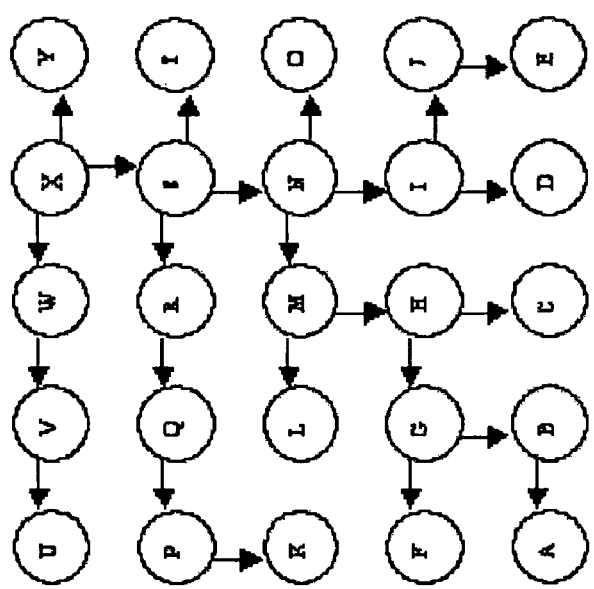
FIG. 4 depicts the wireless sensor network of FIG. 1 after data components have been stored throughout the nodes.

In any event, when node network 12 has been established, it can be used to effectively store data components in a safe and redundant manner. Specifically, referring now to FIG. 3, a data set/structure 50 is shown. Under the present invention, data set 50 is segmented or broken up into distinct data components 52. Thereafter, data components 52 are stored within nodes 13 of the node network 12 described above. Specifically, referring to FIG. 4, node network (hereinafter network 12) of the present invention is shown in greater detail. As depicted, network 12 includes peer to peer nodes A-Y. Data components 52 (FIG. 3) will be stored among nodes A-Y using any known algorithm. For example, the above cross-referenced patent application describes various communication paths that can be followed through network 12 so that data components 52 can be stored within nodes A-Y. One of these possible routes is shown in FIG. 4. To this extent, assume that data components 52 have been stored among nodes A-Y. Reference to this description is a grid type infrastructure such that several (if not every) node A-Y has a piece of the "puzzle."

Currently, there is no functionality to take in to consideration if one of these nodes A-Y has failed or is about to fail, thus causing the final data/application puzzle to be incomplete and irrelevant to the end destination. The present invention addresses this shortcoming by providing the capability to copy/replicate data components from a potentially failing node to one or more other nodes before failure actually occurs (e.g., during the lag time) so that data will not be lost.

Figure 5:
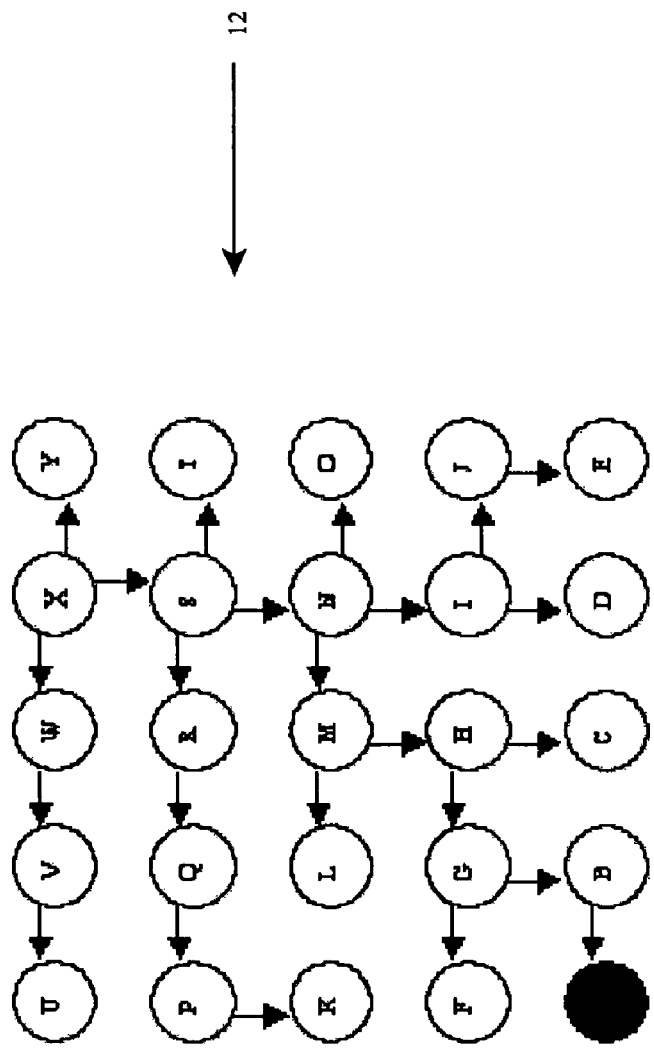
FIG. 5 depicts the wireless sensor network of FIG. 4 after a node has detected a potential failure.

For example, referring to FIG. 5, network 12 is depicted such that node A has detected a potential failure therein. A potential failure within a node is typically detected via the node's internal sensors (e.g., sensor layer 28 of FIG. 2). Such a failure can be due to any cause such as environmental factors, and is not intended to be a limiting part of the present invention. When a potential failure is detected, the node detecting the failure (e.g., node A) will utilize its internal query system 32 (FIG. 2) to query its neighboring (e.g., adjacent) nodes to determine their capability to store the data component(s) currently stored in node A. In this case, node A will query nodes F and B. In a typical embodiment, the capability of neighboring nodes F and B is determined based on factors such as their available resources, their memory capacity, their overall status, etc. It should be understood that in a typical embodiment, the neighboring nodes comprise the horizontal and vertical neighbors. However, it should be understood that neighboring nodes could also mean diagonal neighbors.

Figure 6:
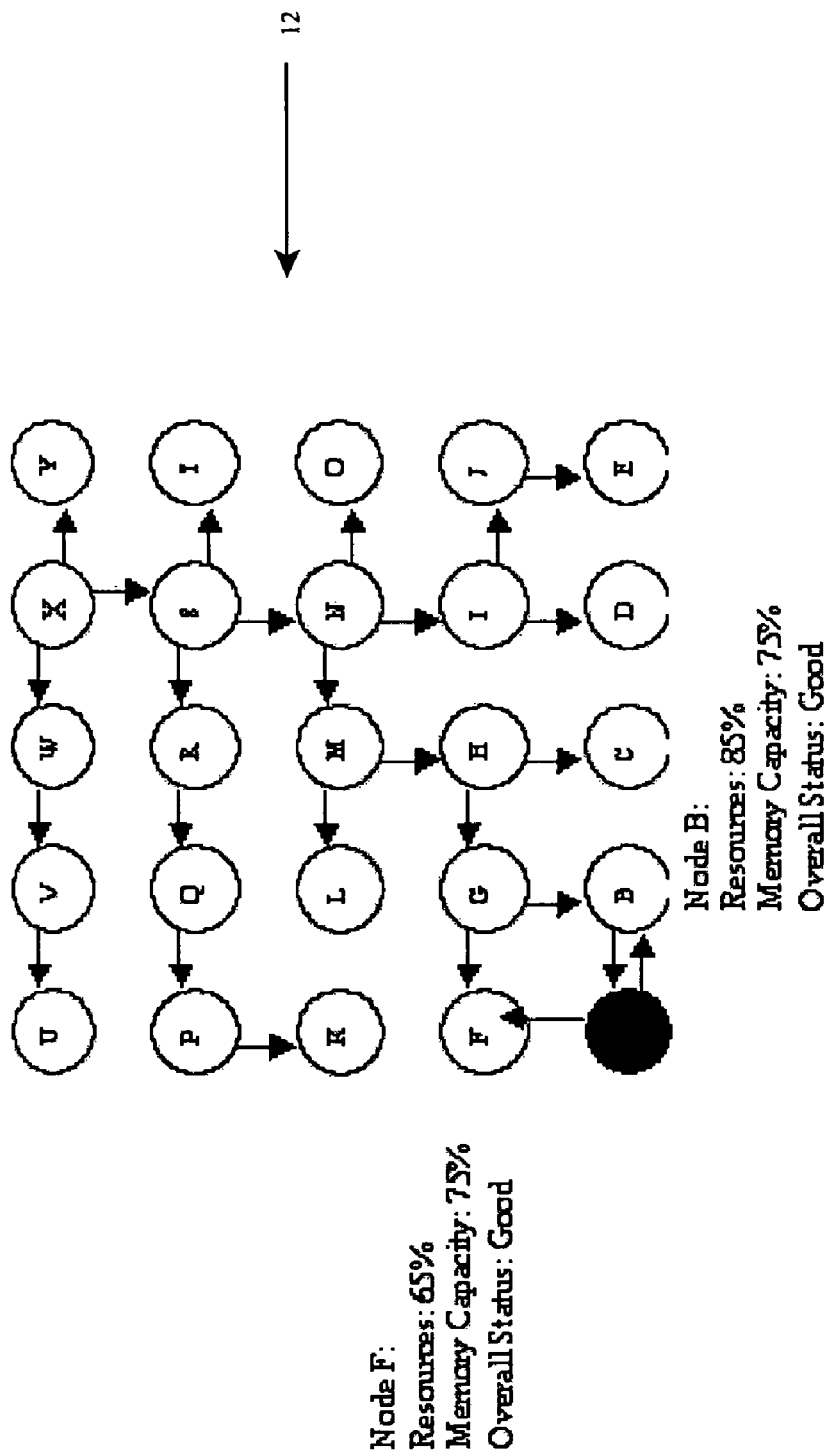
FIG. 6 depicts the wireless sensor network of FIG. 5 after the potentially failing node queries its neighboring nodes according to one embodiment of the present invention.

Referring now to FIG. 6, one set of illustrative results is depicted. As shown, node F has available resources of 65%, an available memory capacity of 75% and an overall status of "Good," while node B has available resources of 85%, an available memory capacity of 75% and an overall status of "Good." Assuming that node A's data component(s) requires a large amount of resources, then based on the query results from its two neighboring nodes, node B appears be the best fit for receiving the data component(s). In such a case, communication system 34 (FIG. 2) within node A will copy/replicate the data component(s) to node B. It should be understood that all of the data component(s) on node A need not be copied to a single receiving node. For example, the data component(s) on node A could be segmented/split between nodes B and F.

In a situation where neither node B nor node F can fulfill node A's requirements, nodes B and F can query their neighboring (adjacent) nodes. In this case, node B will query nodes C and G, while node F will query nodes K and G. This query process can occur for any number of cycles/level, meaning if the neighbors of Nodes B and F neighbors cannot fulfill the requirements, then those neighbors can query their neighbors. For example, node C can query nodes D and H. As indicated, this can occur for N levels, or a specified limit (e.g., 3) can be established.

Figure 7:
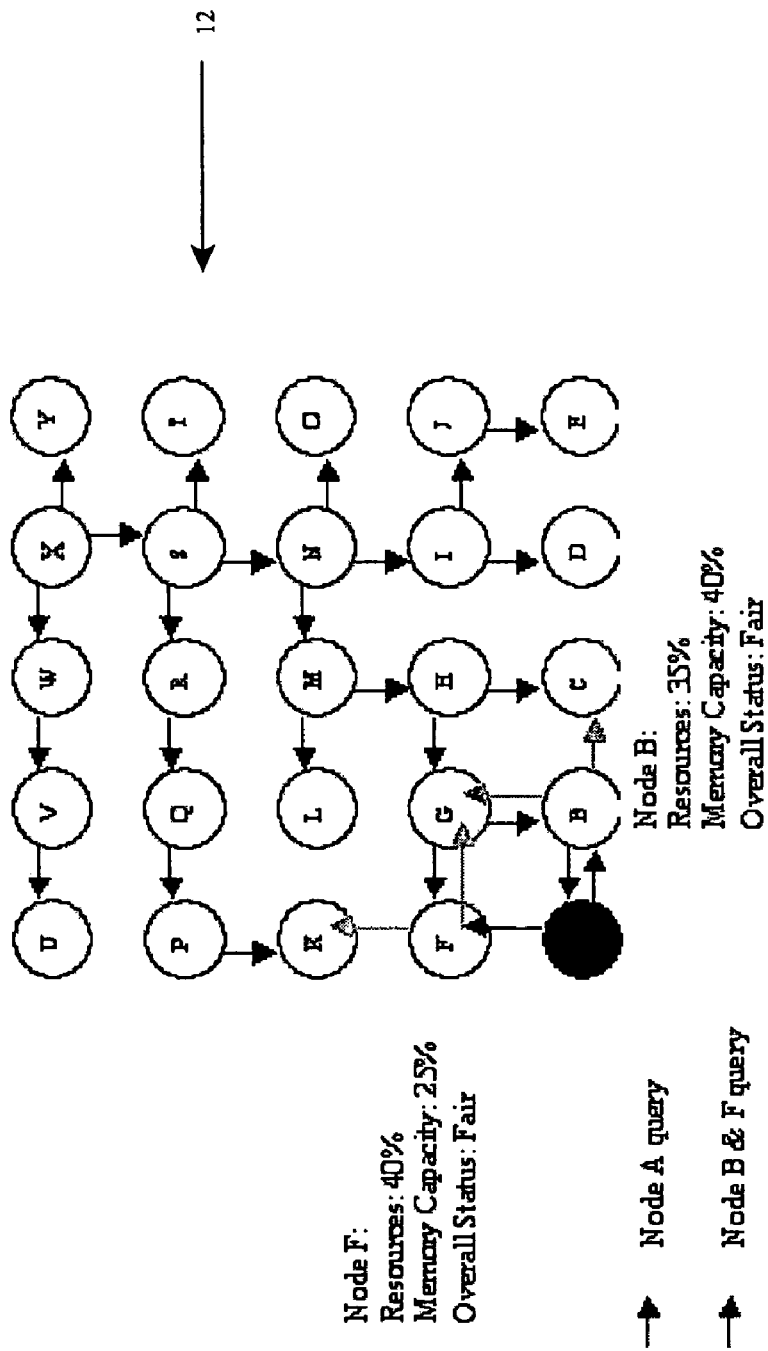
FIG. 7 depicts the wireless sensor network of FIG. 5 after the potentially failing node queries its neighboring nodes according to another embodiment of the present invention.
Figure 8:
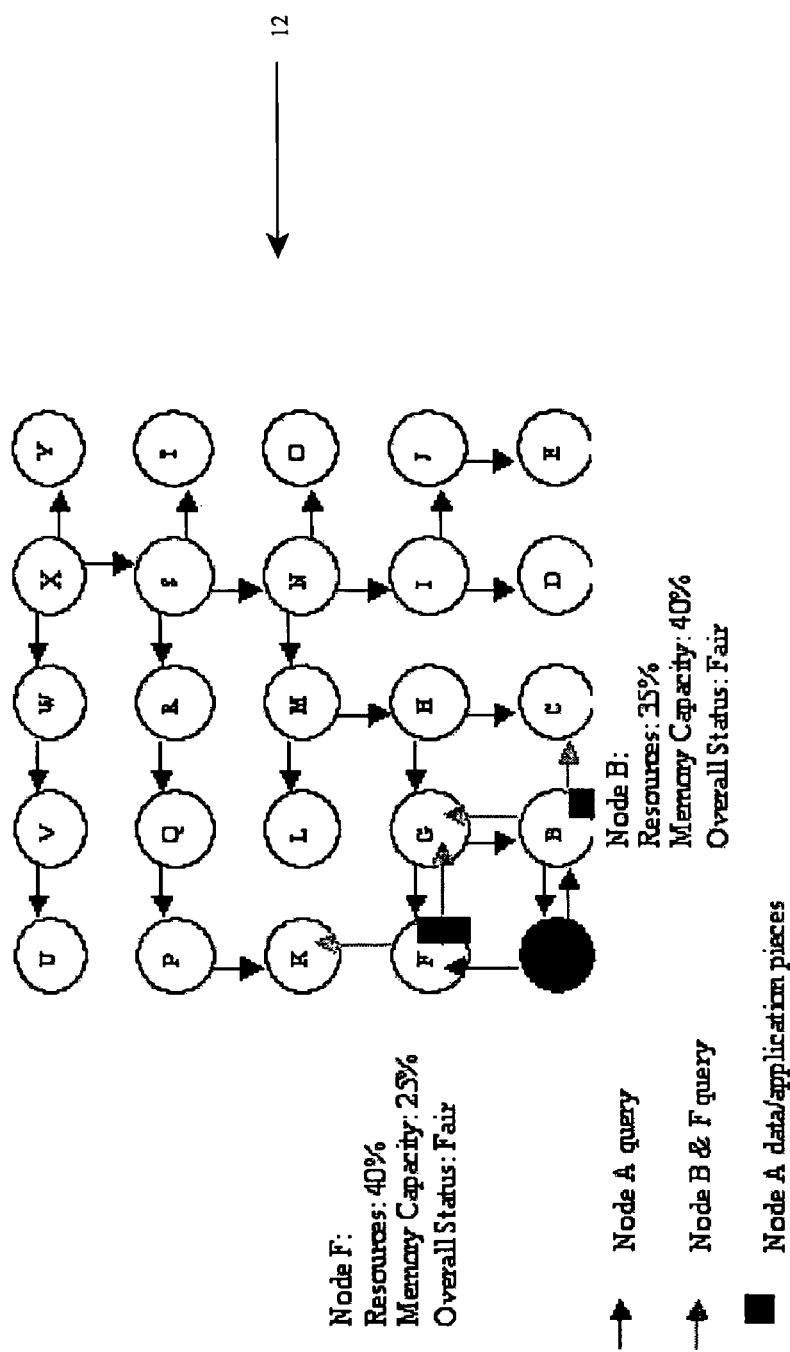
FIG. 8 depicts the wireless sensor network of FIG. 5 after data components from the potentially failing node have been transferred to neighboring nodes based on the querying according to one embodiment of the present invention.
Figure 9:
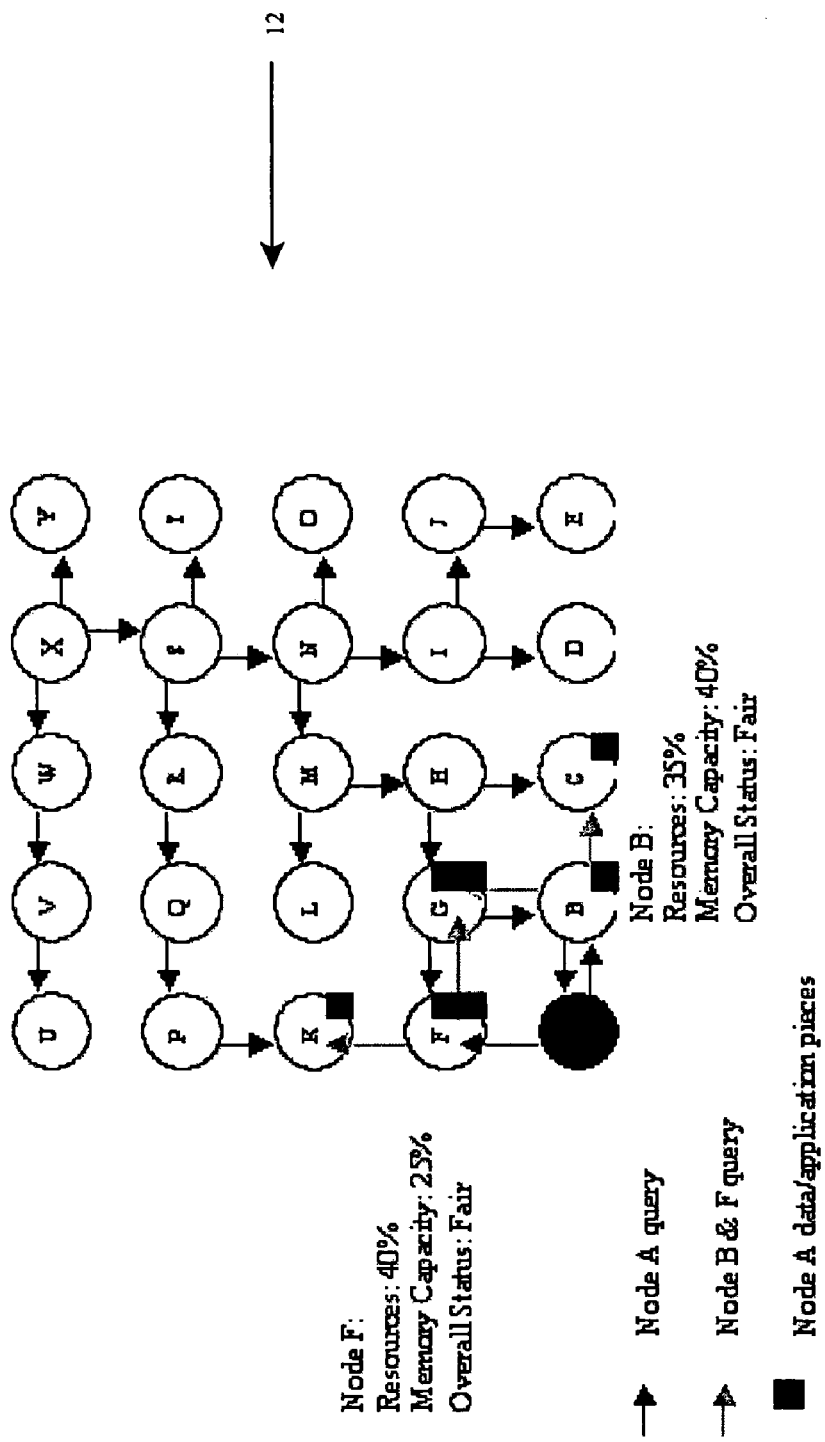
FIG. 9 depicts the wireless sensor network of FIG. 5 after data components from the potentially failing node have been transferred to neighboring nodes based on the querying according to another embodiment of the present invention.

Referring now to FIG. 7, a second set of query results is shown whereby neither node F nor node B individually possess the capability to receive the data component(s) from node A. As depicted, node F has available resources of 40%, an available memory capacity of 25% and an overall status of "Fair," whole node B has available resources of 35%, an available memory capacity of 40% and an overall status of "Fair." As indicated above, in such a case, nodes B and F can query their respective neighboring nodes (e.g., nodes K, G and C) to determine their capability to store the data component(s) of node A. Based on the results, node A will decide how to divide its data component(s) proportional to the capability of the queried nodes. As shown, in FIG. 8, node A has segmented its data component(s) into three parts such that two parts are copied to node F, while one part is copied to node B. However, as indicated above, the division of the data component(s) can also be spread among node B and F's neighbors. Referring to FIG. 9, the scenario is depicted whereby the data component(s) are split between node A's neighbors as well as node B and F's neighbors. Specifically, the data component(s) of node A have been segmented into six parts with two parts being copied to node F, two parts being copied to node G, one part being copied to node B and one part being copied to node C.

It should be understood that any methodology can be utilized in determining if and how data component(s) should be segmented for copying between multiple nodes. For example, the query system within node A can first compute the needed capability to store its data component(s). Then the query system can receive the query results. If a single node does not have the capability to store all data component(s) of node A, the communication system can segment/copy the data component(s) proportionally among multiple nodes according to their capabilities. For example, if node B has the capability to store ⅓ of the data component(s), then node A could copy up to ⅓ of its data component(s) thereto.

In any event, once the data component(s) have been copied, details of the copying will be broadcast to the neighbors of the nodes that received the data component(s) as well as to any other neighbors of the potentially failing node that did not received any data component(s). For example, if node B received all of the data component(s) from node A, node A will broadcast this fact to node F. Similarly, node B will broadcast this fact to nodes G and C. Alternatively, if the data component(s) were split between nodes F and B, node B will broadcast the details (e.g., the data component(s) it had received) to nodes C and G, while node F will broadcast the details (e.g., the data component(s) it had received) to nodes K and G. In general, broadcasting is accomplished via the communication systems (i.e., communication system 34 of FIG. 2) within the nodes (e.g., using Session Initiation Protocol).

After the broadcasting is complete, the update systems within the nodes (e.g., update system 36 of FIG. 2) can be used to update their respective local routing tables. As indicated above, a node's local routing table typically identifies the data component(s) currently stored by that node as well as the data components stored by its neighbors. For example, the local routing table within node A will identify the data component(s) stored within node A as well as those stored within nodes F and B. To this extent, the local routing tables can be thought of as identifying the locations of data component(s) as stored within a subset or local neighborhood of nodes. Conversely, the global routing table 15 (FIG. 1) identifies the locations of all data components stored throughout the entire network 12. In a typical embodiment, the node that is potentially failing (e.g., node A) can be responsible for updating the global routing table 15 via its internal update system.

Figure 10:
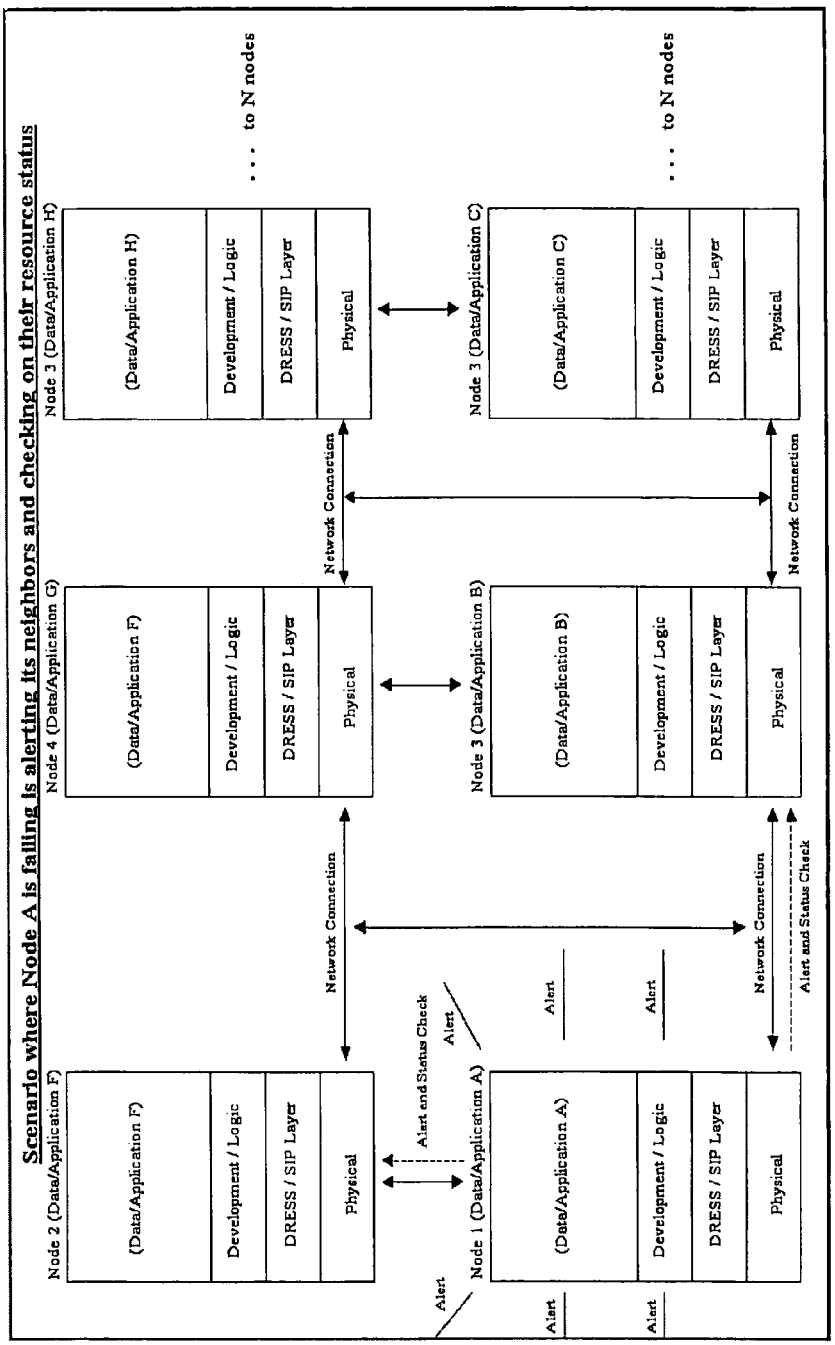
FIG. 10 depicts a more detailed diagram of a potentially failing node querying its neighboring nodes according to one embodiment of the present invention.
Figure 11:
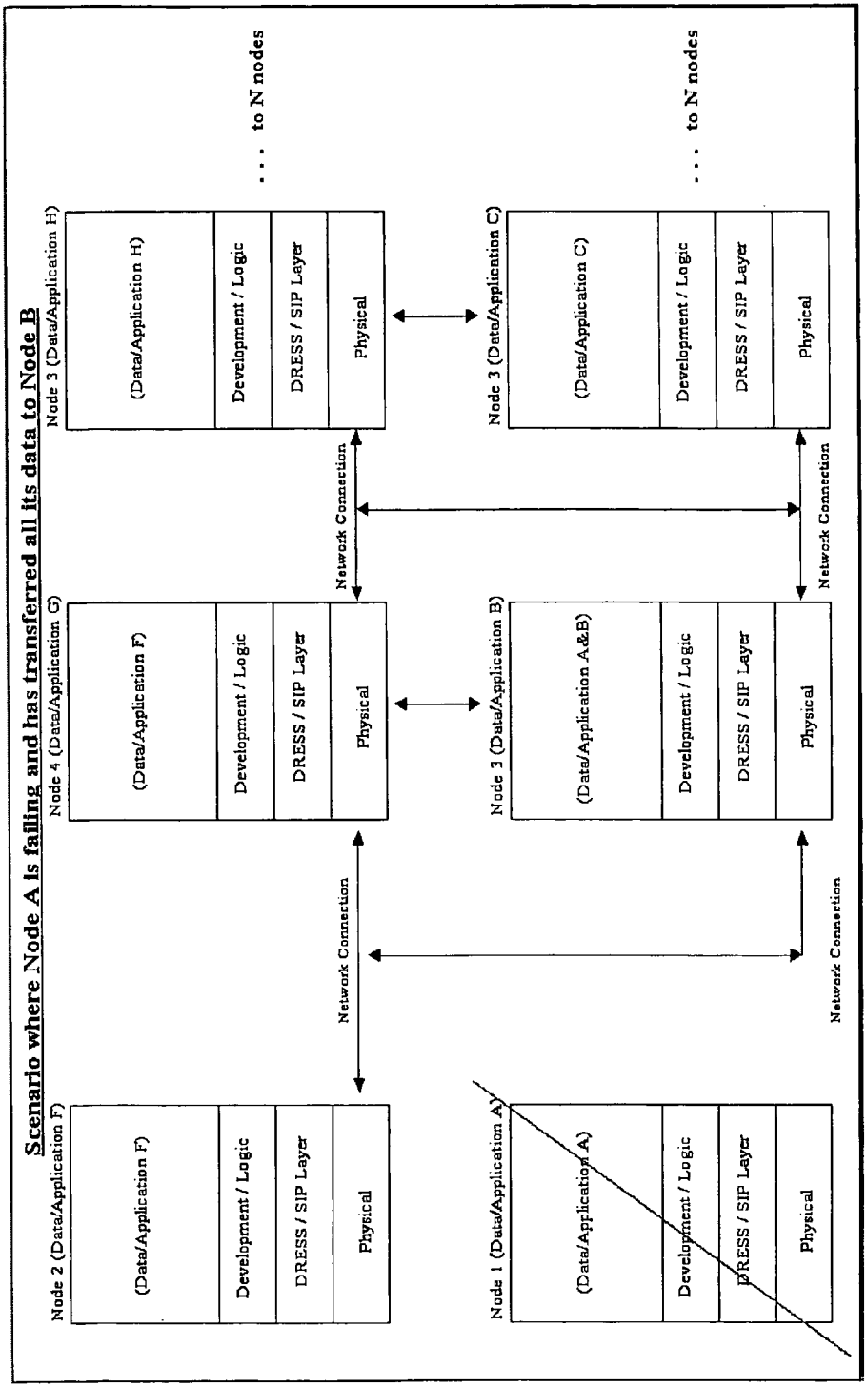
FIG. 11 depicts a more detailed diagram of a potentially failing node transferring its data components to a single neighboring node according to one aspect of the present invention.
Figure 12:
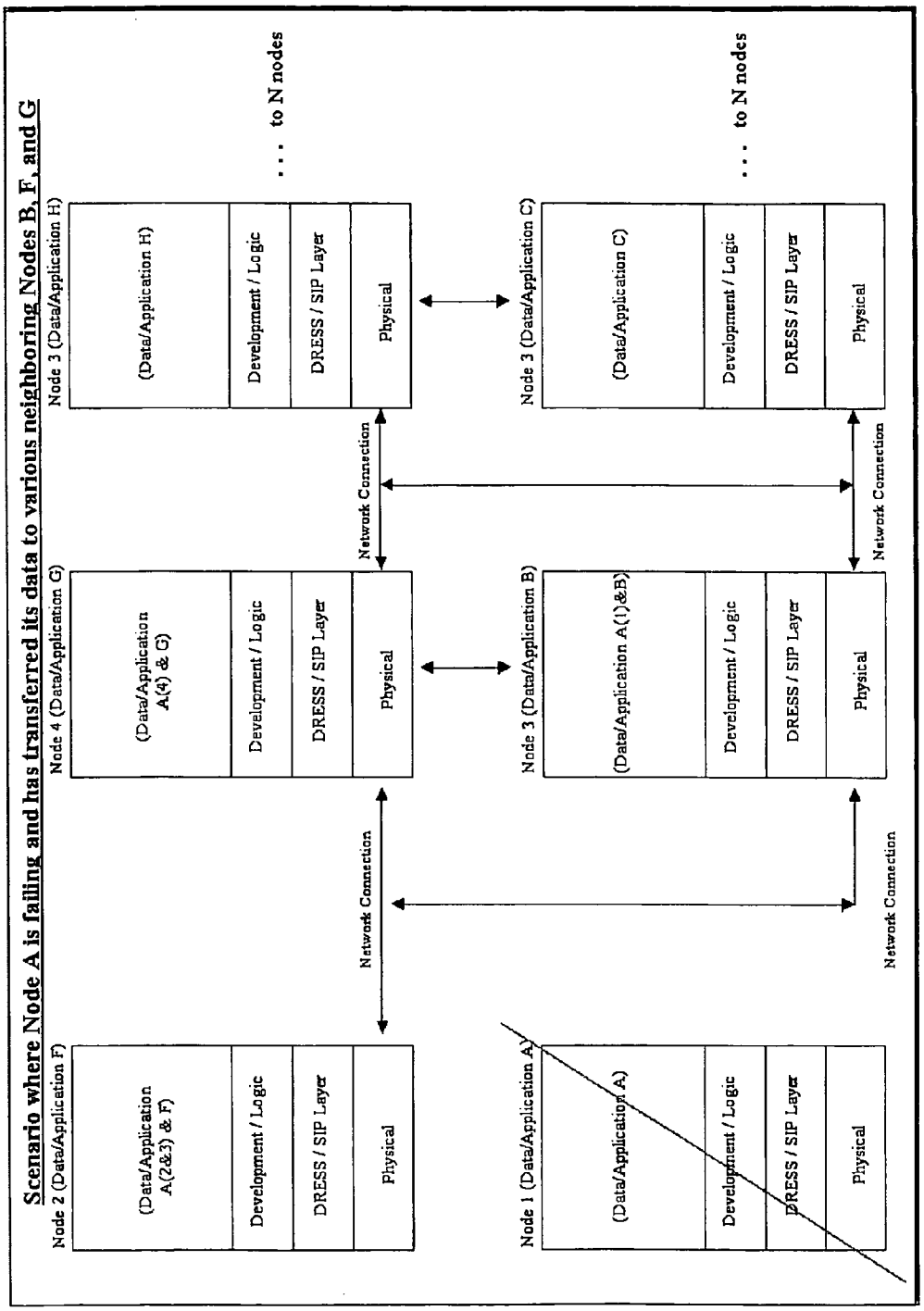
FIG. 12 depicts a more detailed diagram of a potentially failing node transferring its data components to multiple other nodes according to another aspect of the present invention.

Referring now to FIG. 10, a more detailed architectural diagram depicting the scenario where node A is potentially failing and alerting/querying its neighbors is shown. As depicted, node A will initially query its neighbors Nodes F and B to determine their capabilities. FIG. 11 shows the scenario all of node A's data component(s) were copied to node B (i.e., based on the querying, node B was found to have the needed capability). As indicated above, in such a case, node A would broadcast this fact to node F, while node B would broadcast to nodes G and C. Thereafter, each of the local routing tables within nodes F, G, C and B would be updated, and node A could be shut-down for necessary repairs. FIG. 12 depicts the scenario where the data component(s) from node A were segmented into four parts and copied to nodes B, F and G. Specifically, as depicted, node B received one part of the data, node F received two parts of the data, while node G received one part of the data. Just as before, each of these nodes would then broadcast details of the copying (e.g., identify the data components they had received) to their respective neighbors, and all involved routing tables (global or local) would be updated accordingly.

It should be appreciated that the teachings of the present invention could be offered as a business method on a subscription or fee basis. For example, network 12 or nodes 13 could be created, maintained, supported and/or deployed by a service provider that offers the functions described herein for customers.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for copying data components between nodes in a sensor network of peer to peer nodes, comprising:
    sensing a potential failure within one of the nodes, wherein the sensing is performed by an internal sensor of the one node, wherein the internal sensor senses environmental factors;
    querying, based on an indication of the potential failure, neighboring nodes of the one node to determine a capability of the neighboring nodes to store a data component currently stored within the one node;
    copying the data component to at least one of the neighboring nodes based on the querying, the data component being that portion of a data set of the sensor network that is stored in the one node; and
    broadcasting details of the copying from the at least one neighboring node to nodes that are adjacent to the at least one neighboring node.

2. The method of claim 1, further comprising updating a routing table based on the copying.

3. The method of claim 1, wherein the sensor network is a wireless sensor network.

4. The method of claim 1, wherein the querying step comprises querying the neighboring neighboring nodes to determine available resources, a memory capacity and an overall status of the neighboring nodes.

5. The method of claim 1, wherein the copying step comprises copying the data component to one of the neighboring nodes based on the querying.

6. The method of claim 1, wherein the copying step comprises copying distinct parts of the data component to different neighboring nodes based on the querying.

7. The method of claim 1, wherein the data component is not copied to the at least one neighboring node if the querying determines that all of the neighboring nodes lack the capability, and wherein the method further comprises:
    querying nodes adjacent to the neighboring nodes if the neighboring nodes lack the capability to store the data component; and
    copying the data component to at least one of the adjacent nodes based on the querying.

8. The method of claim 1, further comprising:
    providing a data set; and
    dividing the data set into data components.

9. The method of claim 1, further comprising storing the data components among the nodes using a global routing table, prior to the sensing step.

10. A wireless sensor network, comprising:
    a plurality of nodes, each node including an internal sensor that senses environmental factors, query system for querying neighboring nodes, based on an indication of a potential failure, to determine a capability of the neighboring nodes to store data components currently stored within the one node, and a communication system for copying the data components to the neighboring nodes based on the querying, the data components being that portion of a data set of the sensor network that is stored in the one node, wherein the query system queries the neighboring nodes when the internal sensor of a particular node senses a potential failure within the particular node;
    a global routing table identifying locations of data components as stored among the nodes; and
    an update system for updating the global routing table when data components are copied to the neighboring nodes.

11. The wireless sensor network of claim 10, wherein each node further comprises a solar cell.

12. The wireless sensor network of claim 10, wherein the query system queries the neighboring nodes to determine a capability of the neighboring nodes to store a data component currently stored within the particular node.

13. The wireless sensor network of claim 12, wherein the capability of the neighboring nodes to store the data component is determined based upon available resources, a memory capacity and an overall status of the neighboring nodes.

14. The wireless sensor network of claim 10, wherein each node further includes a local routing map identifying data components stored in the neighboring nodes.

15. A node for use in a sensor network, comprising:
   an internal sensor that senses environmental factors for detecting a potential failure within the node;
   a query system for querying, based on an indication of a potential failure, neighboring nodes when the internal sensor detects the potential failure within the node to determine a capability of the neighboring nodes to store a data component currently stored within the one node;
   a communication system for copying the data component currently stored within the node to at least one of the neighboring nodes based on the querying, the data component being that portion of a data set of the sensor network that is stored in the one node; and
   an update system for updating a routing table when the data component is copied.

16. The node of claim 15, wherein the sensor network is a wireless sensor network.

17. The node of claim 15, wherein the sensor senses environmental data to detect the potential failure.

18. The node of claim 15, wherein the query system queries the neighboring nodes to determine a capability of the neighboring nodes to store the data component.

19. The node of claim 18, wherein the capability of the neighboring nodes to store the data component is determined based upon available resources, a memory capacity and an overall status of the neighboring nodes.

20. The node of claim 15, wherein the sensor network comprises a plurality of peer to peer nodes.

21. The node of claim 15, wherein the routing table is a global routing table that identifies locations of data components stored throughout the sensor network.

22. The node of claim 15, wherein the routing table is a local routing table contained within the node that identifies locations of data components as stored in the neighboring nodes, and wherein the update system further updates the local routing table when the data component is copied.

23. The node of claim 15, further comprising a solar cell.

24. A program product stored on a recordable medium for copying data components between nodes in a sensor network of peer to peer nodes, comprising:
   program code for querying neighboring nodes when an internal sensor within a particular node, wherein the internal sensor senses environmental factors, detects a potential failure within the particular node to determine a capability of the neighboring nodes to store a data component currently stored within the one node;
   program code for copying a data component currently stored within the particular node to at least one of the neighboring nodes based on the querying, the data component being that portion of a data set of the sensor network that is stored in the one node; and
   program code for updating a routing table when the data component is copied.

25. The program product of claim 24, wherein the sensor network is a wireless sensor network.

26. The program product of claim 24, wherein the sensor senses environmental data to detect the potential failure.

27. The program product of claim 24, wherein the program code for querying queries the neighboring nodes to determine a capability of the neighboring nodes to store the data component.

28. The program product of claim 27, wherein the capability of the neighboring nodes to store the data component is determined based upon available resources, a memory capacity and an overall status of the neighboring nodes.

29. The program product of claim 24, wherein the sensor network comprises a plurality of peer to peer nodes.

30. The program product of claim 24, wherein the routing table is a global routing table that identifies locations of data components stored throughout the sensor network.

31. The program product of claim 24, wherein the routing table is a local routing table contained within the particular node that identifies locations of data components as stored within the neighboring nodes, and wherein the program code for updating further updates the local routing table.

32. A method for deploying an application for copying data components between nodes in a wireless sensor network of peer to peer nodes, comprising:
   providing a computer infrastructure being operable to:
      query neighboring nodes when an internal sensor within a particular node, wherein the internal sensor senses environmental factors, detects a potential failure within the particular node to determine a capability of the neighboring nodes to store a data component currently stored currently stored within the one node;
      copy a data component currently stored within the particular node to at least one of the neighboring nodes based on the querying, the data component being that portion of a data set of the sensor network that is stored in the one node; and
      update a routing table when the data component is copied.

33. Computer software embodied in a propagated signal, stored in a computer hardware system for copying data components between nodes in a wireless network of peer to peer nodes, the computer software comprising instructions to cause the computer system to perform the following functions:
   query neighboring nodes when an internal sensor within a particular node, wherein the internal sensor senses environmental factors, detects a potential failure within the particular node to determine a capability of the neighboring nodes to store a data component currently stored within the one node;
   copy a data component currently stored within the particular node to at least one of the neighboring nodes based on the querying, the data component being that portion of a data set of the sensor network that is stored in the one node; and
   update a routing table when the data component is copied.

* * * * *